United States Patent [19]

Takanashi et al.

[11] Patent Number: 4,736,242

[45] Date of Patent: Apr. 5, 1988

[54] TRANSITORY SCANNING SPEED PHASE COMPENSATION USING LUMINANCE EDGE DETECTION

[75] Inventors: Itsuo Takanashi, Yokohama; Shintaro Nakagaki, Fujisawa; Ichiro Negishi, Tokyo; Hiroshi Ichimura, Tokyo; Takashi Kuriyama, Tokyo, all of Japan

[73] Assignee: Victor Company of Japan, Ltd., Yokohama, Japan

[21] Appl. No.: 784,867

[22] Filed: Oct. 4, 1985

[30] Foreign Application Priority Data

Oct. 6, 1984 [JP] Japan ................. 59-210254
Dec. 10, 1984 [JP] Japan ................. 59-260590
Dec. 10, 1984 [JP] Japan ................. 59-260591

[51] Int. Cl.⁴ ............... H04N 9/07; H04N 9/077
[52] U.S. Cl. ................. 358/44; 358/43; 358/36
[58] Field of Search ........ 358/47, 44, 43, 41, 358/40, 36, 37, 39, 160, 166, 167; 315/410

[56] References Cited

U.S. PATENT DOCUMENTS

| | | | |
|---|---|---|---|
| 3,543,081 | 11/1970 | Vitek | 315/410 |
| 3,938,181 | 2/1976 | Alvins | 358/160 |
| 4,041,531 | 8/1977 | Bingham | 358/37 |
| 4,358,788 | 11/1982 | Burrowes | 358/39 |
| 4,402,013 | 8/1983 | Wargo | 358/160 |
| 4,415,920 | 11/1983 | Kato et al. | 358/37 |
| 4,450,475 | 5/1984 | Ishikawa et al. | 358/44 |
| 4,527,190 | 7/1985 | Onga et al. | 358/44 |
| 4,620,221 | 10/1986 | Takanashi et al. | 358/44 |

FOREIGN PATENT DOCUMENTS 0073516 6/1979 Japan ................. 358/37
2135853 9/1984 United Kingdom ....... 358/43

Primary Examiner—James J. Groody
Assistant Examiner—Robert M. Bauer
Attorney, Agent, or Firm—Lowe, Price, Leblanc, Becker & Shur

[57] ABSTRACT

In a color imaging apparatus, an optical image is focused on a photoelectrical conversion target of a color image pickup tube through a color stripe filter having a plurality of successively arranged recurrent groups of different color stripes and converted to an electrostatic image which is scanned in rectangular raster form by an electron beam to generate a luminance signal and a color-multiplexed video signal. The leading and trailing edges of the luminance signal are detected by an edge detector to generate a control signal having first and second polarities in response to the detection of the leading and trailing edges, respectively. The color multiplexed signal is phase-controlled with respect to the leading and trailing edges of the luminance signal in accordance with the control signal by a variable delay line or by a pair of beam deflection plates.

19 Claims, 9 Drawing Sheets

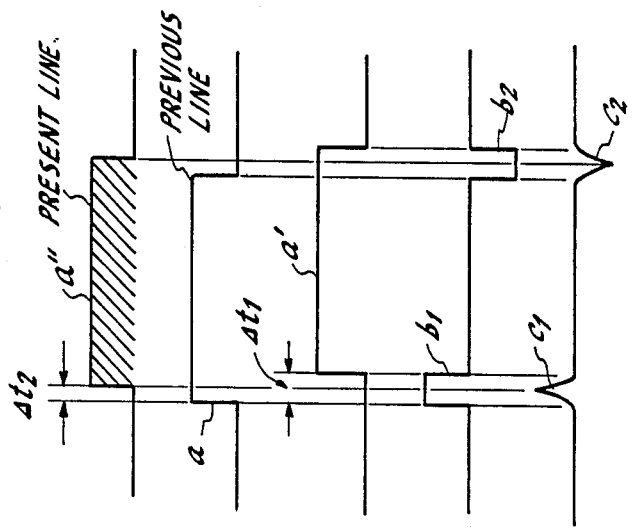
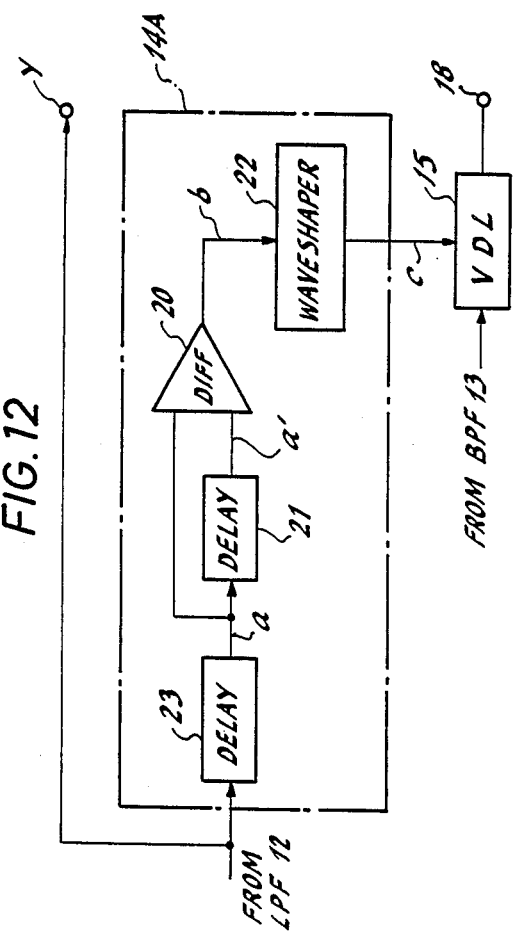
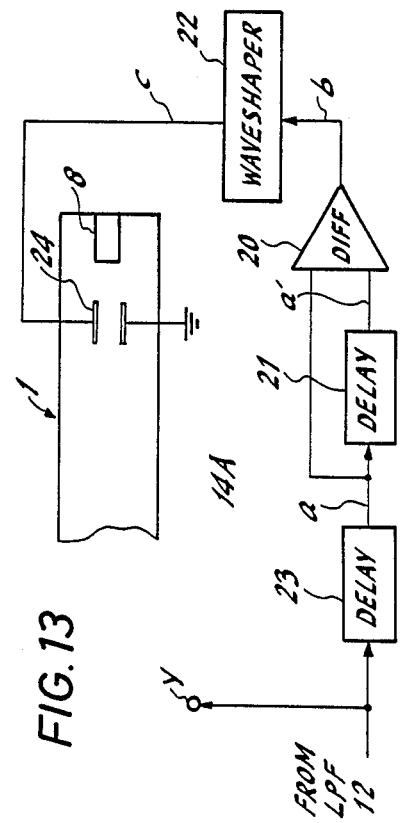

TRANSITORY SCANNING SPEED PHASE COMPENSATION USING LUMINANCE EDGE DETECTION

BACKGROUND OF THE INVENTION

The present invention relates to a single-tube color imaging apparatus having a striped color filter and more particularly to an apparatus which eliminates the problem associated with variation of beam scanning speed resulting from electrostatic potential differences between dark and bright areas on a photoelectrical conversion target.

In a single-tube color imaging apparatus, an optical image is focused through a striped color filter onto a photoelectrical conversion target to develop an electrostatic image which is scanned by an electron beam. The color filter comprises successively arranged recurrent groups of color stripes of different colors. As the beam is scanned across the target, electrostatic potential differences between sharply defined bright and dark areas affects the scanning speed of the beam. This causes the color component of the video signal to vary in phase and causes its leading and trailing edges to deviate from the corresponding edges of the luminance component. As a result, color misregistration occurs on the television screen.

SUMMARY OF THE INVENTION

It is therefore an object of the present invention to eliminate color misregistration which occurs at sharp transitions between dark and bright areas.

In the color imaging apparatus of the invention, an optical image is focused on a photoelectrical conversion target of a color image pickup tube through a color stripe filter having a plurality of successively arranged recurrent groups of different color stripes and converted to an electrostatic image which is scanned in rectangular raster form by an electron beam to generate a luminance signal and a color-multiplexed video signal. An edge detector is provided to respond to the leading and trailing edges of the luminance signal by generating a phase control signal having a waveform representative of a rapid speed variation of the electron beam in the direction of line scan caused by a transitory variation of charges of the electrostatic image. The apparatus includes a phase controller which is responsive to the phase control signal for controlling the phase of the color-multiplexed signal with respect to the leading and trailing edges of the luminance signal.

BRIEF DESCRIPTION OF THE DRAWINGS

The present invention will be described in further detail with reference to the accompanying drawings, in which:

FIGS. 12 and 13 are block diagrams of modified forms of the embodiment of FIG. 1; and FIG. 14 is a timing diagram associated with the embodiments of FIGS. 12 and 13.

DETAILED DESCRIPTION

Figure 1:
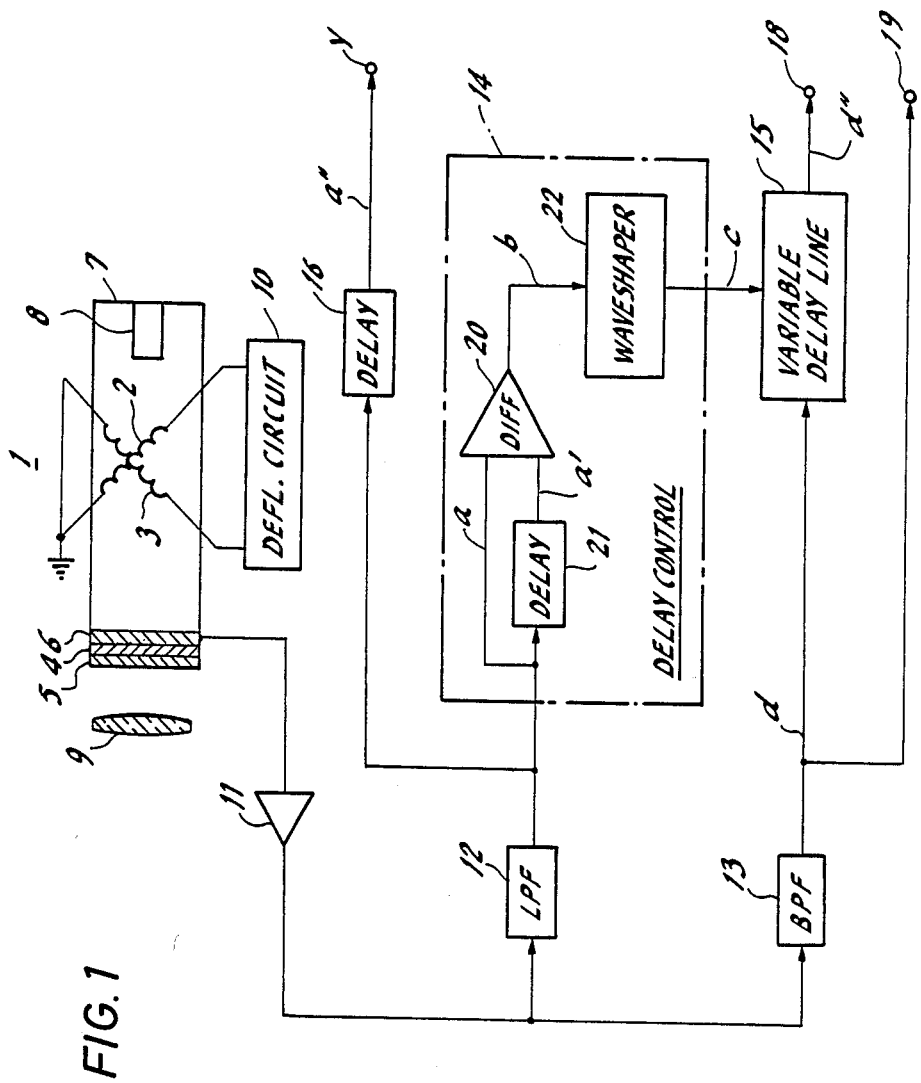
FIG. 1 is a block diagram of single-tube color imaging apparatus incorporating a phase compensation circuit according to a first embodiment of the invention.

Referring now to FIG. 1, a color imaging apparatus according to a first embodiment of the invention includes a a color television pickup tube 1 having a pair of vertical and horizontal deflection yokes 2 and 3, a color stripe filter 4 affixed to the rear side of a transparent faceplate 5 of an evacuated envelope 7, and a photoelectrical conversion target 6 attached to the rear of the filter 4 to be scanned by an electron beam emitted from an electron gun 8. A lens 9 focuses an object scene on the surface of the target 6 through the color filter 4. A video signal is read from the photoconductive layer of the conversion target 6 and applied to a preamplifier 11.

Color filter 4 comprises a plurality of recurrent groups of stripes of a first color F1 (which may be one of the primary colors of blue, green and red, a second color F2 (which is cyan or magneta if F1 is blue, cyan or yellow if F1 is green, or yellow or magneta if F1 is red), and transparency for passing white light. These stripes have equal width and extend vertically throughout the target 6 and successively arranged across the horizontal dimension of the target 6 with the color stripes of each group recurring at intervals T. The filter 4 has therefore a spatial frequency inversely proportional to the periodic interval T. Light passing through the color filter 4 is optically modulated by the striped color filter pattern and develops an electrostatic image on the conversion target 6 which is read by the electron beam scanned. Raster scan is provided by the horizontal and vertical yokes 2 and 3 energized by sweep currents supplied from a deflection circuit 10. For purposes of illustration, it is assumed that the first filter stripe F1 is green and the second stripe F2 is cyan. The light incident on the green stripes is removed of its red and blue components to allow its green component to pass to target 6, while the light incident on the cyan stripes is removed of the red component (R) to allow its green (G) and blue (B) components to pass to target 6. Therefore, if the target is illuminated with an imagewise radiation of white light (equal energies at all wavelengths throughout the visible spectrum), the color-multiplexed signal contains (G), (B+G) and (R+B+G) components derived respectively from stripes F1, F2 and W. Therefore, the video signal $S_0$ obtained from the target 6 is given by:

$$S_0 = \tfrac{1}{3}(3G+2B+R)+A\cdot\sin(\omega t+\phi+\theta)+(A/2)\sin(2\omega t-\phi+2\theta) \quad (1)$$

where, $$A = -(\sqrt{3}/\pi)(B^2+B\cdot R+R^2)^{\tfrac{1}{2}}$$

$$\phi=\tan^{-1}(R-B)/\sqrt{3}(R+B)$$
$$\omega=2\pi/T=2\pi f_1$$

(where $f_1$ represents the frequency of the "carrier"). The phase component $\phi$ indicates a phase deviation from the reference phase of the "carrier" and represents the spatial difference between the individual filter stripes within each recurrent group, and the phase component $\theta$ represents a phase deviation attributed from the nonlinearity of the deflection system.

The output of preamplifier 11 is applied to a low-pass filter 12 and to a band-pass filter 13. Low-pass filter 12 passes the luminance component of the video signal through a delay circuit 16 to a luminance output terminal Y. Low-pass filter 12 has a cut-off frequency lower than the "carrier" frequency $f_1$. The color "carrier" component of the video signal, represented by the second term of Equation 1, is passed through the band-pass filter 13 to a variable delay line 15 and thence to a color output terminal 18. The output of band-pass filter 13 is also coupled to a second color output terminal 19. As will be described later, the output terminals 18 and 19 are coupled to a processing circuit from which color difference signals are derived for further processing in a color matrix circuit in which they are combined with a baseband component represented by the first term of Equation 1.

Figure 2:
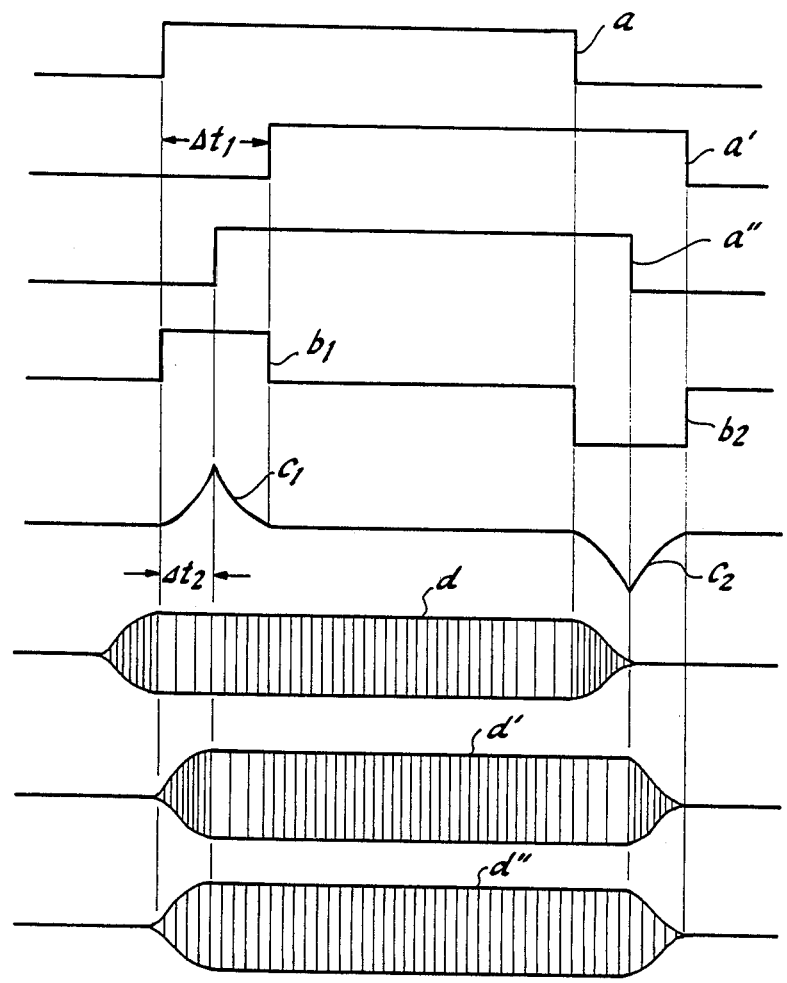
FIG. 2 is a timing diagram associated with the compensation circuit of FIG. 1.

Delay control circuit 14 includes a differential amplifier 20 having a first input terminal coupled to the output of low-pass filter 12. The second input of the differential amplifier 20 is applied from the output of low-pass filter 12 through a delay circuit 21 having a constant time delay $\Delta t_1$. If the input to the delay circuit 21, which is represented by a rectangular pulse a in FIG. 2, has a duration longer than the delay time $\Delta t_1$, differential amplifier 20 generates a positive-going pulse $b_1$ and a negative-going pulse $b_2$ as a result of comparison between the pulse a and an output a from the delay circuit 21 immediately following the leading and trailing edges of the pulse a, respectively. A waveshaper 22 shapes the rectangular pulses $b_1$ and $b_2$ into pulses $c_1$ and $c_2$ each having exponentially rising and falling edges.

The output of band-pass filter 13, which is in the form of a burst pulse d, is delayed by variable delay circuit 15 under control of circuit 14 as follows.

Figure 3:
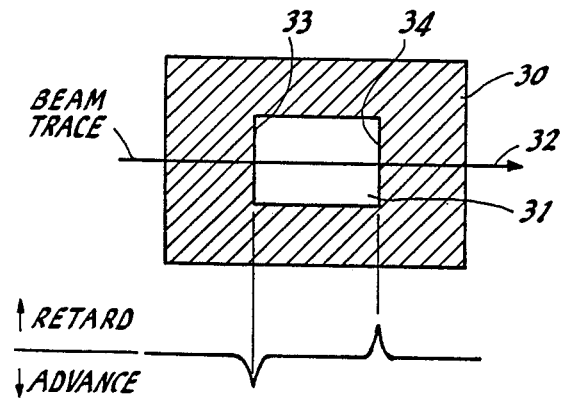
FIG. 3 is a sketch illustrating the phase variations of color-multiplexed signal in response to an electron beam traversing sharp transitions between dark and bright areas.

If the incident optical image has a dark area 30 surrounding a brighter area 31 as shown in FIG. 3 and is scanned in the direction of arrow 32, the path of electrons impinging on the target will be slightly bent rightward as they approach a transition 33 from dark area 30 to bright area 31 by an increasing potential gradient produced between them. As the beam crosses a transition 34 from bright area 31 to darker area 30 it will be slightly bent leftward by a potential gradient which decays as the impinging electrons recede from transition 34. These scanning speed variations cause the color signal burst to be advanced in phase $\phi$ on its leading edge and retarded in its trailing edges as indicated by a waveform d in FIG. 2.

Variable delay line 15 is adjusted such that when the output voltage of waveshaper 22 is zero the pulse burst d is delayed by $\Delta t_2$ as indicated at d'. The leading and trailing edges of the delayed burst pulse d' are therefore time-coincident with the time of occurrences of delay control voltages $c_1$ and $c_2$, respectively. Therefore, the positive delay control voltage $c_1$ causes the variable delay circuit 15 to increase its delay from the reference time delay $\Delta t_2$ to retard the phase-advanced portion of the delayed burst pulse d' and the negative delay control voltage $c_2$ causes it to decrease its delay from the reference time delay to advance the phase-retarded portion of the delayed burst pulse d'. A phase-compensated burst pulse d'' is thus generated by variable delay line 15. It is seen that pulse a is delayed by $\Delta t_2$ with respect to the burst pulse d''. To compensate for this time difference, pulse a is delayed by $\Delta t_2$ in the delay circuit 16 and delivered as a pulse a'' to terminal Y.

Figure 4:
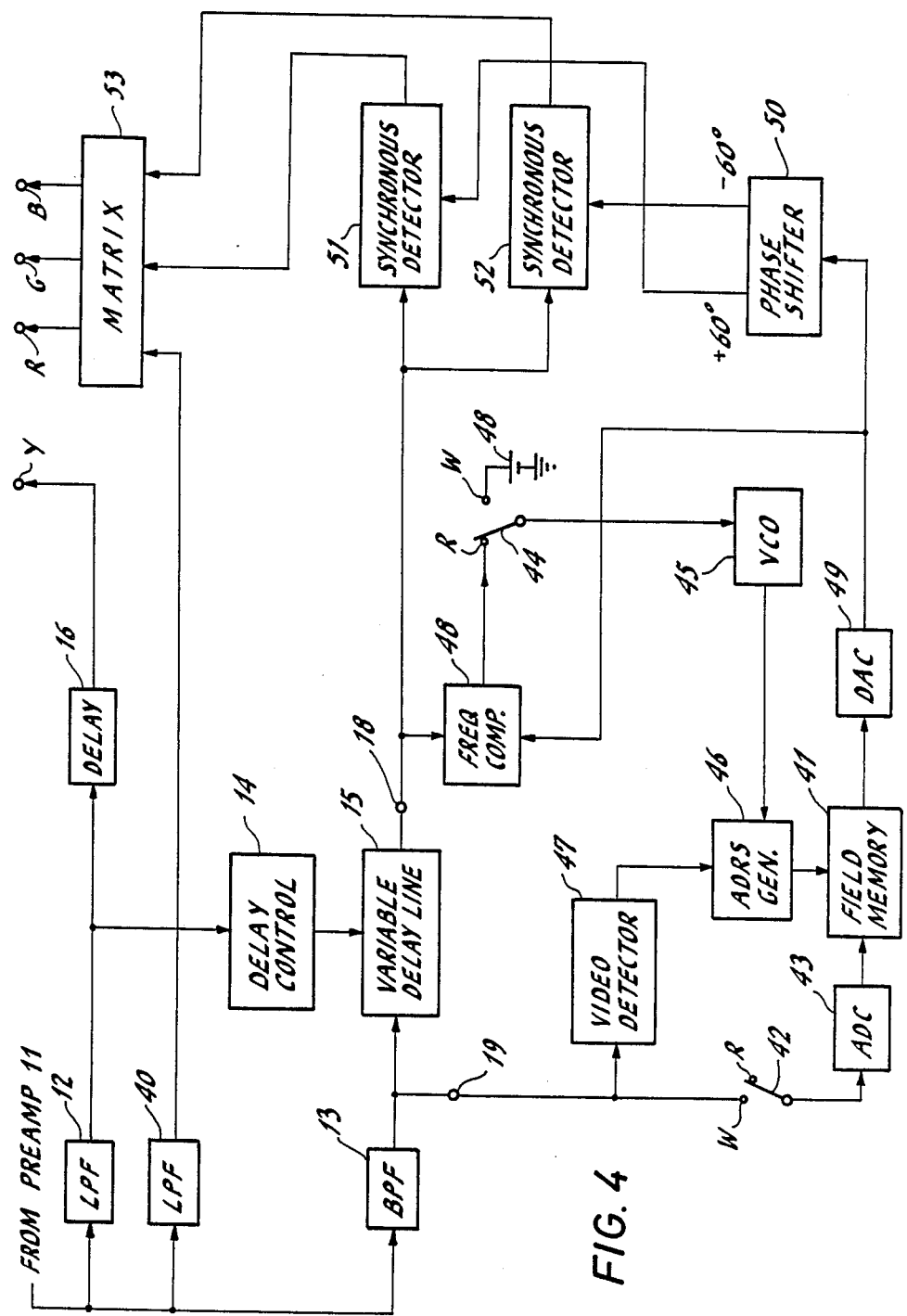
FIG. 4 is a block diagram of a color processing circuit used in conjunction with the compensation circuit of FIG. 1.

FIG. 4 is an illustration of one example of the processing circuit in which the color signals from the output terminals 18 and 19 of FIG. 1 are processed to derive color difference signals. Processing circuit includes a field memory 41 to store a reference signal. This reference signal is derived from the signal from output terminal 19 through a read-write switch 42 and an analog-to-digital converter 43. During a write-mode which occurs prior to the normal operation of the imaging apparatus, switches 42 and 44 are manually switched to write position W and the target 6 of camera tube 1 is illuminated uniformly with light of a predetermined color to generate a "carrier" at frequency $f_1$, this carrier being digitized by A/D converter 43 and written into field memory 41. A voltage-controlled oscillator 45 is supplied with a standard voltage from a voltage source 48 through switch 44 to supply constant-frequency clock pulses to an address generator 46. A video carrier detector 47 detects the leading edge of the "carrier" and enables the address generator 46 to count the clock pulses and generate address codes successively specifying the storage locations of memory 41. During normal operation, switches 42 and 44 are returned to read position R and the target 6 is illuminated with an actual optical image to produce a signal which is a "carrier" modulated in amplitude in accordance with the intensity of picture elements of the image and in phase in accordance with the color filter stripes of each recurrent group, as represented by the second term of Equation 1. This signal has a phase difference $\phi$ with respect to the "carrier" stored in memory 41.

A frequency comparator 48 compares the frequencies of the color signal supplied from variable delay line 15 and the output of a digital-to-analog converter 49 and supplies a control voltage through switch 44 to the VCO 45 to read the memory 41 at a variable rate in accordance with the frequency difference detected by the frequency comparator 48. As a result, the VCO 45 is controlled to reduce the frequency difference to zero and a reference signal represented by $\sin(\omega t+\theta)$ is generated by memory 41. Since the phase component $\theta$ is equal to the phase component contained in the modulated "carrier", nonlinearity inherent in the deflection system 10 is compensated.

The output of memory 41 is converted into analog form by D/A converter 49 and fed to a phase shifter 50 where it is shifted in phase by $+60°$ and $-60°$ with respect to the modulated "carrier" and applied respectively to synchronous detectors 51 and 52 to which the output of variable delay ine 15 is also applied. Color difference signals are produced by the synchronous detectors 51 and 52 and applied to a color matrix circuit 53. A low-pass filter 40 is connected to the preamplifier 11 to pass the baseband of the color-multiplexed signal to the matrix circuit 53 and combined with the color difference signals to generate primary color signals, which are applied to terminals R, G and B.

While the embodiment of FIG. 1 is suitable for eliminating the phase shift problem for luminance pulses with a duration longer than delay time $\Delta t_1$, it is not appropriate when the luminance pulse duration is smaller than the delay time $\Delta t_1$. Embodiments shown in FIGS. 5 and 6 are appropriate for this purpose.

Figure 5:
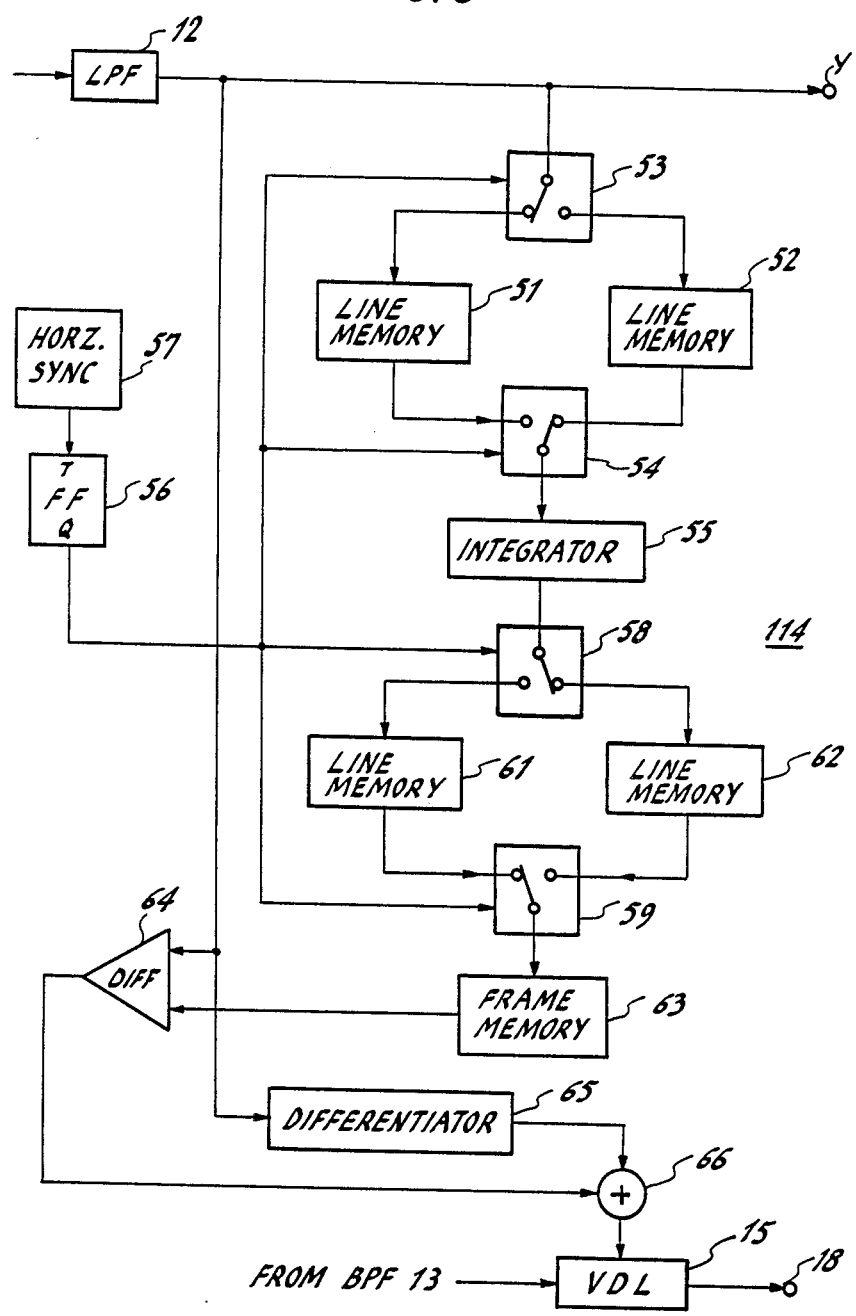
FIG. 5 is a block diagram of the compensation circuit according to a second embodiment of the invention.
Figure 6:
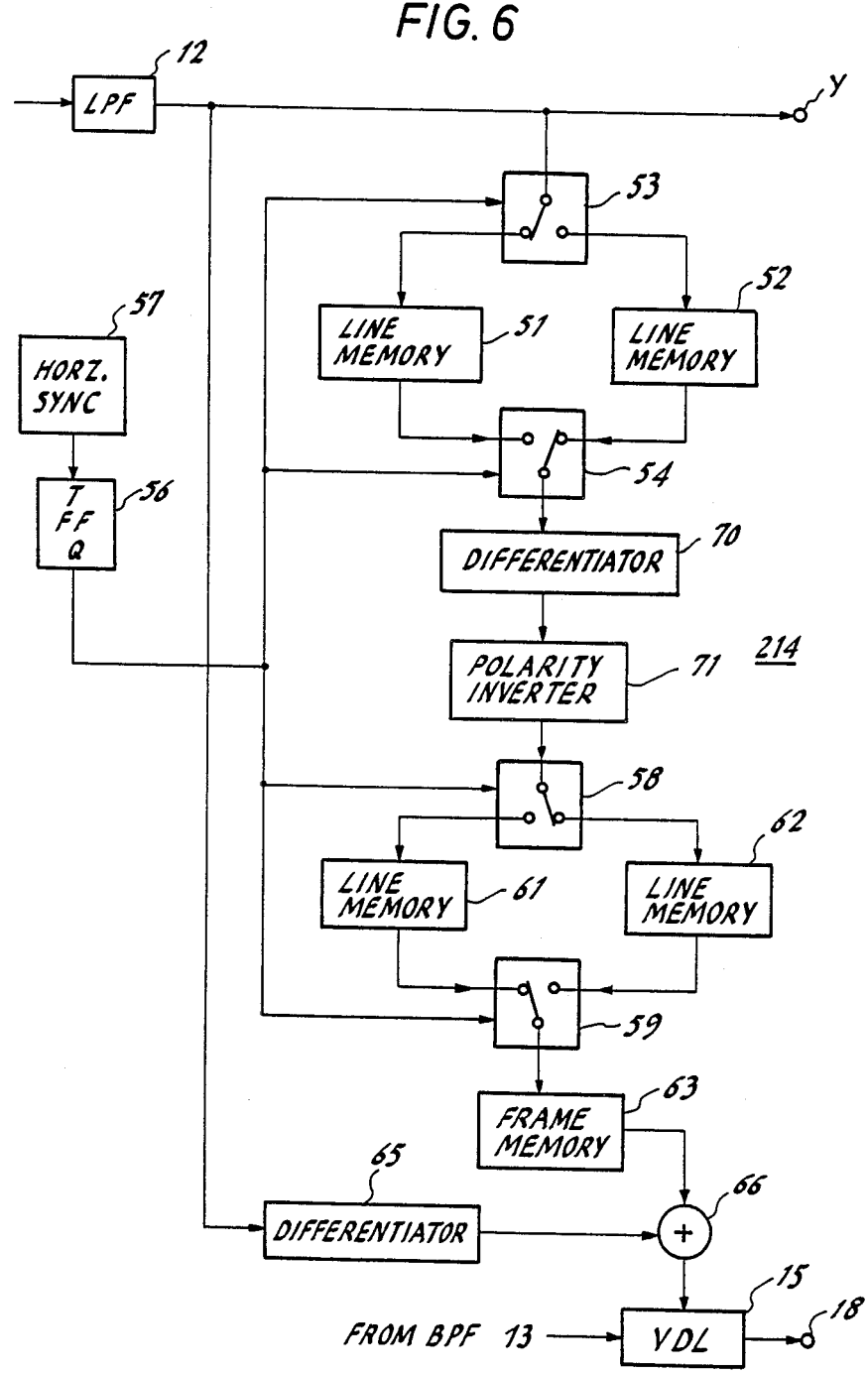
FIG. 6 is a block diagram of a modification of the embodiment of FIG. 5.

In FIG. 5 wherein the same numerals are used to designate parts corresponding to those in FIG. 1, delay control circuit 114 includes a first pair of first-in-last-out CCD (charge-coupled device) line memories 51 and 52 and a pair of electronic switches 53 and 54. The luminance signal from low-pass filter 12 is alternately coupled by switch 53 to line memories 51 and 52 and the outputs of memories 52 and 51 are alternately coupled by switch 54 to an integrator 55. The connections of switches 53 and 54 to memories 51 and 52 are alternated under control of the output of a T-flip-flop 56 in response to horizontal sync pulses from sync source 57, so that when each line memory is in a write mode the other is in a read mode. The output of integrator 55 is alternately coupled by a switch 58 to first-in-last-out CCD line memories 61 and 62, the outputs of memories 61 and 62 being alternately coupled by a switch 59 to a first-in-first-out CCD frame memory circuit 63 in opposite fashion to switch 58 under control of the output of flip-flop 56.

Figure 7:
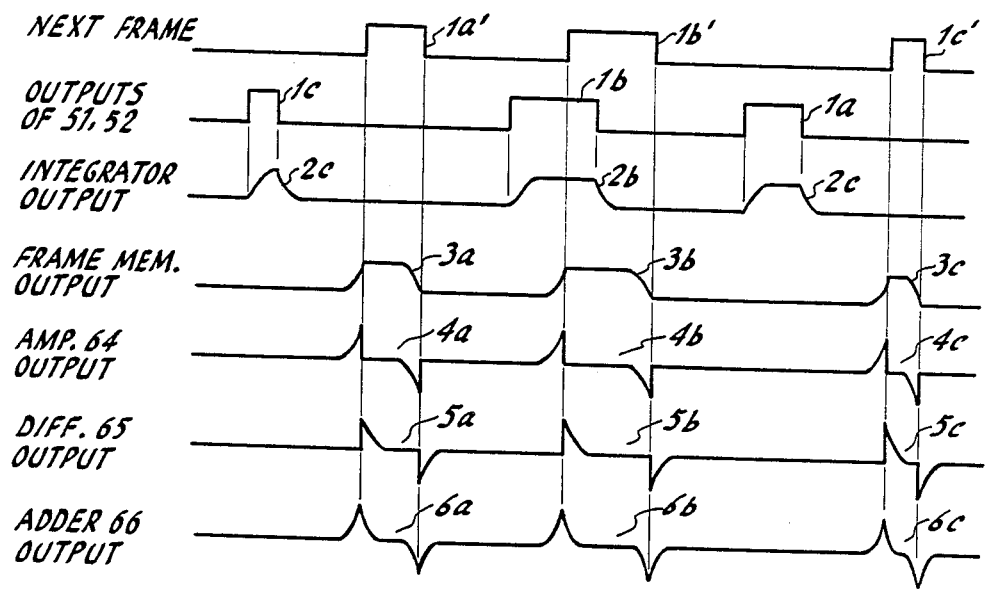
FIGS. 7 and 8 are timing diagrams associated with the embodiments of FIGS. 5 and 6, respectively.

The function of the memories 51 and 52 is to store luminance signals at alternate line scans and reverse the order of occurrence of the individual luminance pulses of each line scan, so that if luminance pulses $1a$, $1b$ and $1c$ are generated in sequence they will appear in opposite order as indicated by rectangular pulses $1c$, $1b$ and $1a$ in FIG. 7. Pulses $1c$, $1b$, $1a$ are integrated by integrator 55 so that the leading and trailing edges of each pulse become exponential. Memories 61 and 62 have the same function as memories 51 and 52, so that the output pulses of integrator 55 are reversed in the order of their occurrences and fed to frame memory 63 in the same order as they are developed from the conversion target 6. Therefore, when the stored pulses are read from frame memory 63 in the next frame, the "knee" of the rising edge and the "foot" of the falling edge of these pulses will be respectively time-coincident with the leading and trailing edges of luminance pulses $1a'$, $1b'$ and $1c'$ which are supplied from low-pass filter 12 during the corresponding line scan of the next frame as shown in FIG. 7. These coincidences occur due to the inherent correlation between successive frames. If correlation between successive lines can be utilized, it is possible to dispense with the frame memory 63.

The integrated pulses from frame memory 63 and the output of low-pass filter 12 are applied to a differential amplifier 64, which detects the difference in amplitude between rectangular pulses $1a'$, $1b'$, $1c'$ and the integrated pulses $3a$, $3b$, $3c$, respectively, to produce pulses of opposite polarities in successive pairs $4a$, $4b$, $4c$ with each pair having an exponential leading edge. The output of low-pass filter 12 is also applied to a differentiator 65, so that pulses $1a'$, $1b'$ and $1c'$ are differentiated into pulses in successive pairs $5a$, $5b$, $5c$ with each pulse having an exponential trailing edge. The outputs of differential amplifier 64 and differentiator 65 are summed in an adder 66, whereby the pulses in pairs $4a$, $4b$, $4c$ are combined with pulses in pairs $5a$, $5b$, $5c$, respectively, to produce pulses in pairs $6a$, $6b$, $6c$, with each pulse having exponential leading and trailing edges. The output of adder 66 controls the variable delay line 15 in a manner as described previously. Since the positive and negative peaks of each delay control voltage coincide with the leading and trailing edges of luminance pulses $1a'$, $1b'$, $1c'$, the output of low-pass filter 12 is applied to luminance output terminal Y dispensing with the delay circuit 16.

Figure 8:
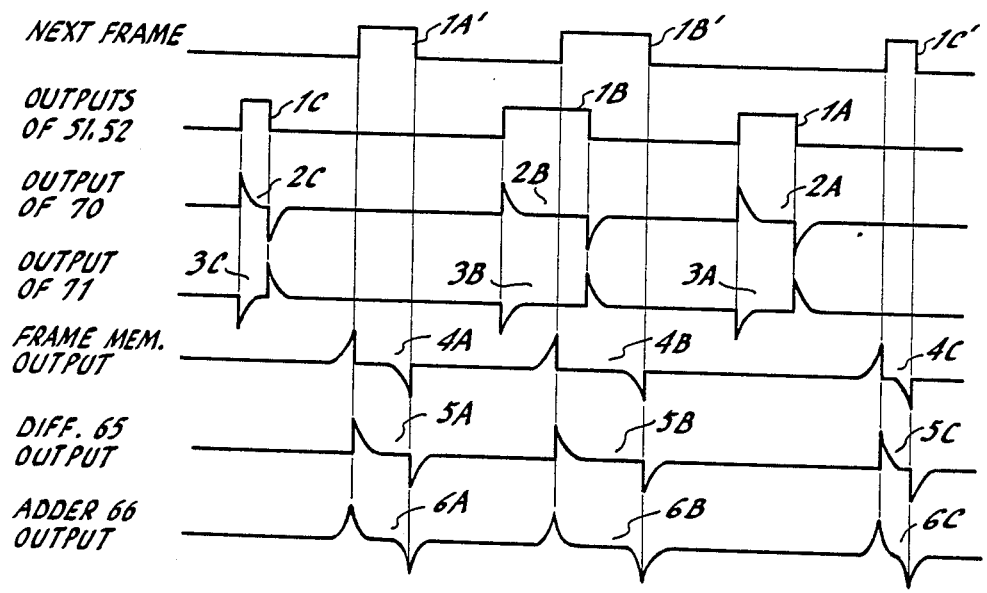

Delay control circuit 214 shown in FIG. 6 is similar to the FIG. 5 embodiment with the exception that it employs a differentiator 70 and a polarity inverter 71 instead of the integrator 55 and differential amplifier 64 of the previous embodiment. As shown in FIG. 8, luminance pulses 1C, 1B and 1A from the memories 51, 52 are differentiated by differentiator 70 to produce pulses in pairs 1C, 1B and 1A which are reversed in polarity by inverter 71 to produce pulses in pairs 3C, 3B, 3A. Pulses 3C, 3B, 3C are reversed in the order of occurrence by memories 61 and 62 and stored into frame memory 63 to form pulses 4A, 4B and 4C which coincide with luminance pulses 1A', 1B' and 1C' of the corresponding line scan of the next frame, respectively. Adder 66 combines pulses 5A, 5B, 5C from differentiator 65 with pulses 4A, 4B, 4C from memory 63 to produce delay control voltage pulses 6A, 6B and 6C.

Figure 9:
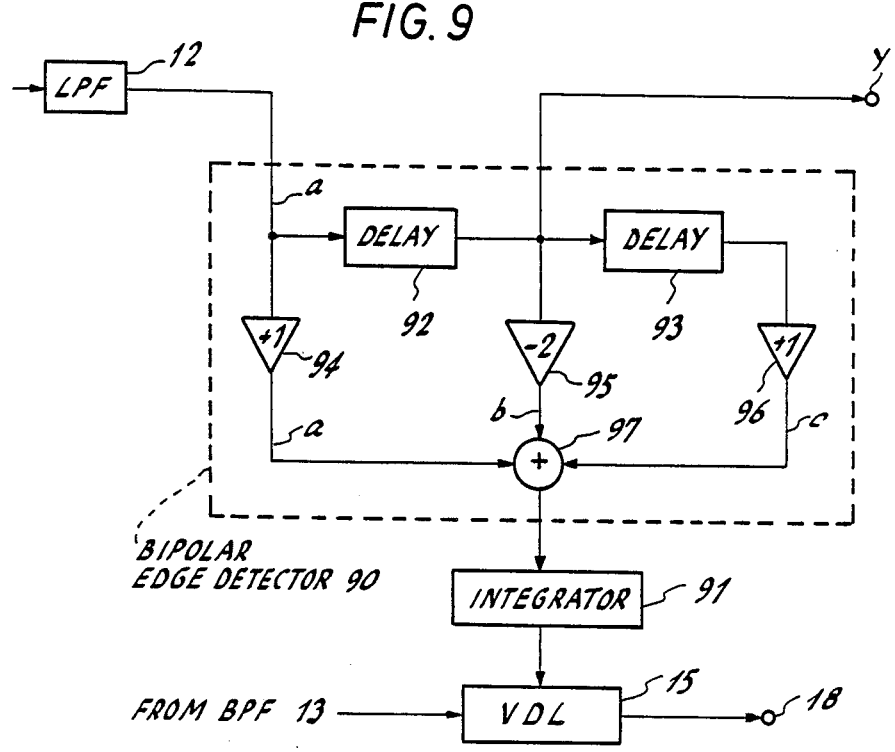
FIG. 9 is a block diagram of an alternative form of the embodiment of FIG. 1.
Figure 10:
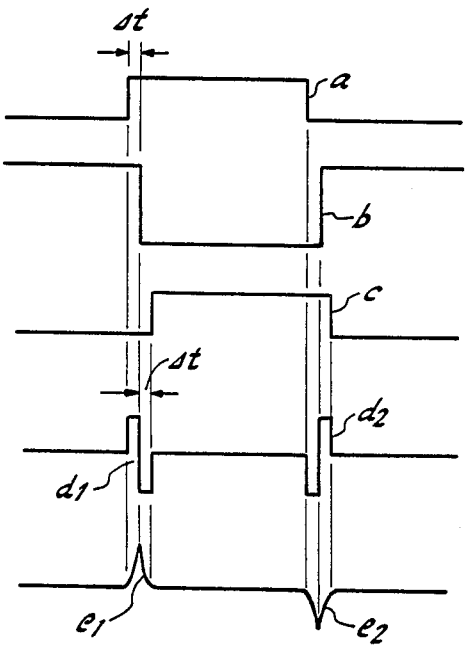
FIG. 10 is a timing diagram associated with the embodiment of FIG. 9.

FIG. 9 is an alternative form of the delay control circuit of FIG. 1. This embodiment includes a bipolar edge detector 90 and an integrator 91 which integrates the output of edge detector 90 and controls the variable delay circuit 15. Edge detector 90 comprises delay circuits 92 and 93 connected in series from the output of low-pass filter 12. Noninverting unity-gain amplifiers 94 and 96 apply the outputs of low-pass filter 12 and delay circuit 93 to an adder 97. The output of delay circuit 92 is coupled to adder 97 by an inverting amplifier 95 having a gain twice as high as the amplifiers 94 and 96. Each of the delay circuit 92 and 93 has a delay time $\Delta t$. As shown in FIG. 10, luminance pulse a is delayed by circuit 92 and multiplied by $-2$ by amplifier 95 to produce a pulse b and delayed twice by circuits 92 and 93 to produce a pulse c. Summation of these pulses results in the generation of bipolar pulses $d_1$, $d_2$ at each of the leading and trailing edges of pulse a. The integration of pulses $d_1$, $d_2$ by integrator 91 generates positive- and negative-going delay control pulses $e_1$, $e_2$. The output of delay circuit 92, whose leading and trailing edges coincide with the positive and negative peaks of pulses $e_1$, $e_2$, is connected to the output terminal Y.

Figure 11:
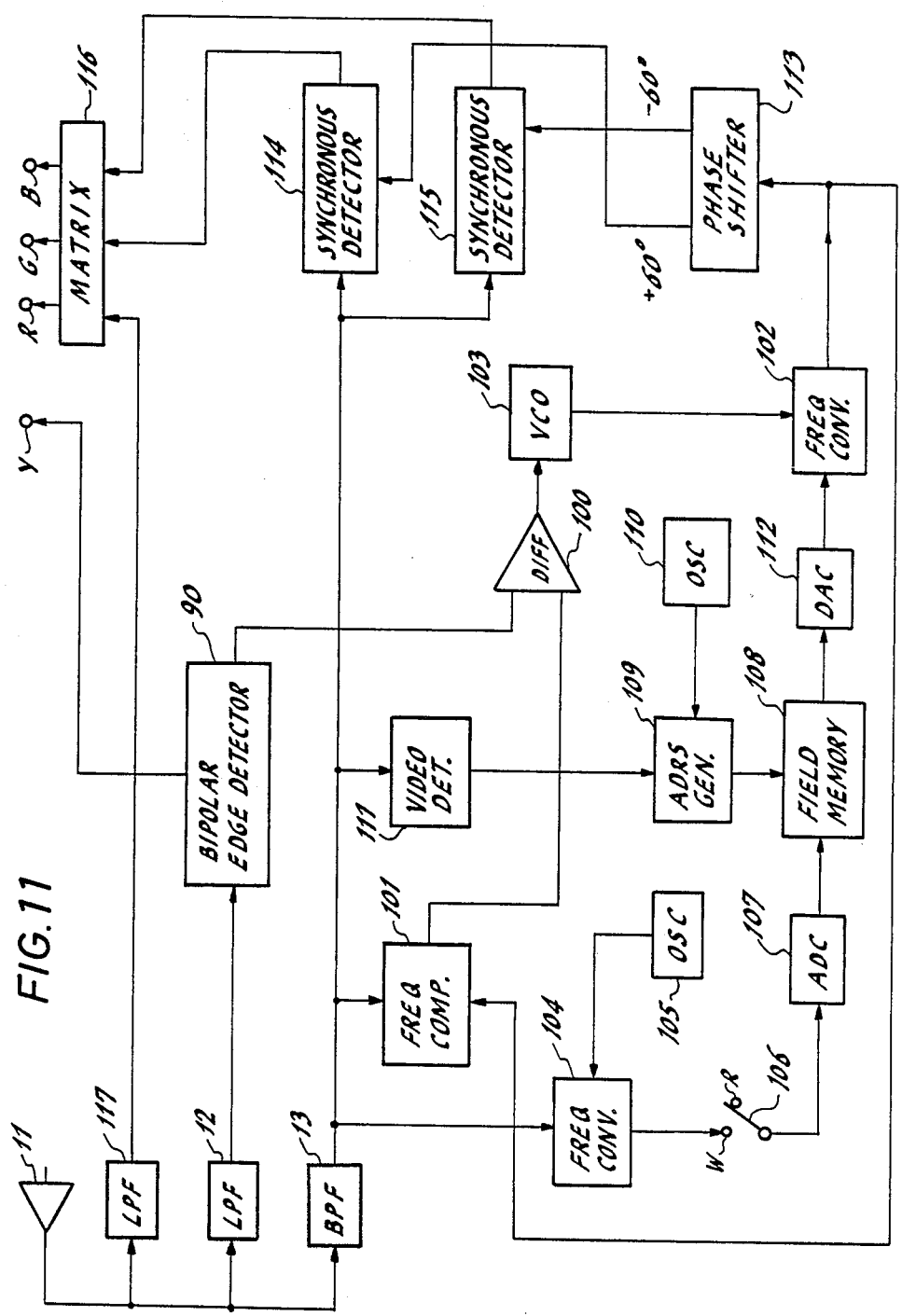
FIG. 11 is a block diagram of color imaging apparatus incorporating the embodiment of FIG. 9.

Since output pulses $d_1$ and $d_2$ from bipolar edge detector 90 can be considered as a representation of the variation of the scanning speed of electron beam as it encounters bright-dark transitions, edge detector 90 can be advantageously employed to control the frequency of a reference signal from which color difference signals are derived. FIG. 11 is a block diagram of an embodiment suitable for this purpose.

In FIG. 11, the output of the bipolar edge detector 90 is applied to one input of a differential amplifier 100. The second input of differential amplifier 100 is received from the output of a frequency comparator 101 which compares the frequency of the output of band-pass filter 13 with the frequency of the output of a frequency converter 102. The output of adder 100 controls the frequency of a voltage-controlled oscillator 103 which in turn controls the output frequency of frequency converter 102. As in the embodiment of FIG. 4, the photoelectrical conversion target of camera tube 1 is uniformly illuminated with light of a predetermined color to generate a "carrier" prior to normal operation of the imaging apparatus. The carrier is passed through the band-pass filter 13 to a frequency converter 104 where it is reduced in frequency by mixing it with a local-oscillator signal from source 105. The frequency-converted carrier is applied through mode select switch 106 to A/D converter 107 and thence to field memory 108. The capacity of memory 108 is only needed in the amount that is smaller than is otherwise required to store the carrier if the frequency reduction is not performed. Read-write operations of memory 108 are controlled by address generator 109 which is clocked by oscillator 110 when enabled by video carrier detector 111. The carrier is read out of memory 108 into D/A converter 112 during normal operation to produce a reference signal. The reference is fed to frequency converter 102 which reconverts it to the original frequency. The frequency difference detected by comparator 101 is reduced to zero by feeding back the output of converter 102 to frequency converter 101, so that the reference signal coincides in frequency with the modulated "carrier" from band-pass filter 13 which is affected by the nonlinearity of the deflection system. In addition to the nonlinearity compensation, the output of bipolar edge detector 90 controls the VCO 103 to compensate for the phase variations resulting from the beam's transitory scanning speed variations. The output of frequency converter 102 is applied to phase shifter 113. As in FIG. 4, phase shifter 113 supplies a pair of phase-shifted reference signals to synchronous detectors 114 and 115 which combine them with the output of band-pass filter 13 to supply color difference signals to matrix circuit 116 where they are combined with the baseband of the video signal supplied from low-pass filter 117.

Further alternative embodiments of FIG. 1 are illustrated in FIGS. 12 and 13. In FIG. 12, delay control circuit 14A is similar to delay control circuit 14 with the exception that it additionally includes a delay circuit 23 having a delay time equal to one scan line period minus $\Delta t_2$. Therefore, the output of delay circuit 23 indicated by a pulse a in FIG. 14 is a signal developed in the previous line scan and advanced by $\Delta t_2$ with respect to the corresponding pulse a" in the present line scan. Pulse a is delayed by $\Delta t_1$ by delay circuit 21 to supply a delayed pulse a' to differential amplifier 20 to which the output of delay 23 is also applied. Differential amplifier 20 produces pulses $b_1$ and $b_2$ which are shaped into pulses $c_1$ and $c_2$ as in a manner identical to FIG. 1. It is seen that the positive and negative peaks of the pulses $c_1$, $c_2$ coincide with the leading and trailing edges of pulse a", respectively, they can be used as a delay control signal for variable delay line 15. The output of low-pass filter 12 is applied directly to luminance output terminal Y, dispensing with the low-pass filter 16 of FIG. 1.

In FIG. 13, the delay control circuit 14A is used to control the scanning speed of the electron beam, rather than to control the delay time of the color video signal. In this modification, the output of waveshaper 22 is applied to a pair of horizontal deflection plates 24. These deflection plates may either be the normal horizontal deflection plates of a camera tube or extra deflection plates provided in a camera tube of the electromagnetic deflection type. The control voltage impressed on deflection plates 24 counteracts on the sweeping electron beam to momentarily decrease the scanning speed as it approaches a dark-to-bright transition and momentarily increase the speed as it leaves a bright-to-dark transition.

What is claim is:

1. Color imaging apparatus wherein an optical image is focused on a photoelectrical conversion target of a color image pickup tube through a color stripe filter having a plurality of successively arranged recurrent groups of different color stripes and converted to an electrostatic image which is scanned in line-by-line rectangular raster form by an electron beam to generate a luminance signal and a color-multiplexed video signal, comprising:

edge detector means responsive to each of leading and trailing edges of said luminance signal and generating therefrom a phase control signal representative of a rapid speed variation of said electron beam in the direction of line scan caused by a transitory variation of charge of said electrostatic image; and phase control means responsive to said phase control signal for controlling the phase of said color-multiplexed signal with respect to the leading and trailing edges of said luminance signal.

2. Color imaging apparatus as claimed in claim 1, wherein said phase control means comprises variable delay means for introducing a delay time to said color-multiplexed signal in accordance with said control signal.

3. Color imaging apparatus as claimed in claim 1, wherein said phase control means comprises a pair of horizontal deflection plates provided in said pickup tube for controlling the speed of the electron beam in accordance with said control signal.

4. Color imaging apparatus as claimed in claim 1, wherein said phase control signal has a first polarity component having exponential leading and trailing edges and a first peak therebetween and a second, opposite polarity component having exponential leading and trailing edges and a second peak therebetween, said first and second peaks being time-coincident with the detected leading and trailing edges of said luminance signal.

5. Color imaging apparatus as claimed in claim 1, wherein said edge detector means comprises:

delay means for introducing a delay time to said luminance signal;

differential amplifier means having a first input responsive to the luminance signal delayed by said delay means and a second input responsive to the non-delayed luminance signal; and means for shaping the waveform of an output signal from said differential amplifier means into a first polarity pulse having exponential leading and trailing edges with a first peak therebetween and a second, opposite polarity pulse having exponential leading and trailing edges with a second peak therebetween, said first and second polarity pulses being applied to said phase control means as said control signal.

6. Color imaging apparatus as claimed in claim 1, wherein said edge detector means comprises:

first delay means for delaying a luminance signal developed when said electron beam scans along a given line so that said developed luminance signal is advanced by a predetermined amount with respect to a luminance signal which will be developed when said electron beam scans along a subsequent line;

second delay means for delaying the luminance signal delayed by said first delay means by a predetermined amount with respect to said luminance signal developed from the subsequent line scan;

differential amplifier means having a first input responsive to the output of said first delay means and a second input responsive to the output of said second delay means; and means for shaping the waveform of an output signal from said differential amplifier means into a first polarity pulse having exponential leading and trailing edges with a first peak therebetween and a second, opposite polarity pulse having exponential leading and trailing edges with a second peak therebetween, said first and second polarity pulses being applied to said phase control means as said control signal, said first and second peaks being time-coincident with the leading and trailing edges of said luminance signal developed in said subsequent line.

7. Color imaging apparatus as claimed in claim 1, wherein said edge detector means comprises:

first and second delay means connected in series for introducing first and second delay times of equal amount to said luminance signal;

means for multiplying the amplitude of an output signal from said first delay means; and adder means for summing the multiplied signal, an output signal from said second delay means and the non-delayed luminance signal and producing first pulses of first and second polarities immediately following the leading edge of the non-delayed luminance signal and second pulses of the second and first polarities immediately following the trailing edge of the non-delayed luminance signal.

8. Color imaging apparatus as claimed in claim 7, further comprising integrator means for integrating said first and second pulses to generate said control signal.

9. Color imaging apparatus as claimed in claim 7, wherein said video signal has a frequency inversely proportional to the intervals at which said recurrent groups are arranged, said video signal varying in phase with the relative values of primary color components contained in the optical image passing through the stripes of each group and in amplitude with the intensity of said primary color components, and wherein said phase control means includes;

a field memory;

reading and writing means for writing into the memory, during a write-in mode, a reference carrier having a duration of at least one field derived from said target when the target is uniformly illuminated by light of a predetermined color passing through said color stripe filter and repeatedly reading the memory during a read-out mode to generate a constant-amplitude reference signal having a reference phase;

frequency control means for controlling the frequency of said reference signal read out of said memory in response to an output signal from said adder means; and means responsive to said video signal and said frequency-controlled reference signal for deriving color difference signals.

10. Color imaging apparatus as claimed in claim 1, wherein said edge detector means comprises:

means including a pair of first and second line memories for alternately storing said luminance signal in a first direction and alternately reading the stored luminance signal out of the first and second memories in a second direction opposite to said first direction;

an integrator for integrating an output signal from said first and second line memories;

means including a pair of third and fourth line memories for alternately storing an output signal from said integrator in a first direction and alternately reading the stored signal out of the third and fourth memories in a second direction opposite to the first direction;

a differentiator for differentiating said luminance signal;

a differential amplifier having a first input responsive to said luminance signal and a second input responsive to an output signal from said third and fourth memories; and means for summing output signals from said differentiator and said differential amplifier to generate said control signal.

11. Color imaging apparatus as claimed in claim 1, wherein said edge detector means comprises:

means including a pair of first and second line memories for alternately storing said luminance signal in a first direction and alternately reading the stored luminance signal out of the first and second memories in a second direction opposite to said first direction;

a first differentiator for differentiating an output signal from said first and second line memories;

means for inverting the polarity of an output signal from said differentiator;

means including a pair of third and fourth line memories for alternately storing an output signal from said polarity inverting means in a first direction and alternately reading the stored signal out of the third and fourth memories in a second direction opposite to the first direction;

a second differentiator for differentiating said luminance signal; and means for summing output signals from said second differentiator and said third and fourth line memories to generate said control signal.

12. Color imaging apparatus as claimed in claim 10, further comprising a frame memory for storing output signals from said third and fourth line memories for the duration of a frame and supplying the stored signals to the second input of said differential amplifier.

13. Color imaging apparatus as claimed in claim 11, further comprising a frame memory for storing output signals from said third and fourth line memories for the duration of a frame and supplying the stored signals to said summing means as said output signals from said third and fourth line memories.

14. Color imaging apparatus wherein a color image is focused on a photoelectrical conversion target of a color image pickup tube through a color stripe filter and converted to an electrostatic image which is scanned in line-by-line raster form by an electron beam under the control of a deflection system in response to horizontal and vertical sync pulses to generate a color-multiplexed video signal from said photoelectrical conversion target, said color stripe filter comprising a plurality of recurrent groups of different color stripes successively arranged at periodic intervals so that said video signal has a frequency inversely proportional to the intervals at which said recurrent groups are arranged, said video signal varying in phase with the relative values of primary color components contained in the color image passing through the stripes of each group and in amplitude with the intensity of said primary color components, comprising:
- a field memory;
- read-write means for writing into the memory, during a write-in mode, a reference signal having a duration of at least one field derived from said target when the target is uniformly illuminated by light of a predetermined color passing through said color stripe filter and repeatedly reading the field memory during a read-out mode to generate a constant-amplitude reference video signal having a reference phase;
- edge detector means responsive to leading and trailing edges of said luminance signal and generating therefrom a phase control signal representative of a rapid speed variation of said electron beam in the direction of line scan caused by a transitory variation of charges of said electrostatic image;
- variable delay line means responsive to said phase control signal for controlling the phase of said color-multiplexed video signal with respect to the leading and trailing edges of said luminance signal; and
- means for deriving a pair of color component signals from said phase-controlled color-multiplexed video signal and said reference video signal.

15. Color imaging apparatus wherein a color image is focused on a photoelectrical conversion target of a color image pickup tube through a color stripe filter and converted to an electrostatic image which is scanned in raster form by an electron beam under the control of a deflection system in response to horizontal and vertical sync pulses to generate a color-multiplexed video signal from said photoelectrical conversion target, said color stripe filter comprising a plurality of recurrent groups of different color stripes successively arranged at periodic intervals so that said video signal has a frequency inversely proportional to the intervals at which said recurrent groups are arranged, said video signal varying in phase with the relative values of primary color components contained in the color image passing through the stripes of each group and in amplitude with the intensity of said primary color components, comprising:
- a field memory;
- read-write means for writing into the memory, during a write-in mode, a reference signal having a duration of at least one field derived from said target when the target is uniformly illuminated by light of a predetermined color passing through said color stripe filter and repeatedly reading the field memory during a read-out mode to generate a constant-amplitude reference video signal having a reference phase;
- edge detector means responsive to leading and trailing edges of said luminance signal and generating therefrom a phase control signal representative of a rapid speed variation of said electron beam in the direction of line scan caused by a transitory variation of charges of said electrostatic image;
- phase control means responsive to said phase control signal for controlling the phase of said reference video signal read out of said memory with respect to the leading and trailing edges of said luminance signal; and
- means for deriving a pair of color component signals from said color-multiplexed video signal and said phase controlled reference video signal.

16. Color imaging apparatus as claimed in claim 15, wherein said edge detector means is a bipolar edge detector responsive to leading and trailing edges of said luminance signal for generating a first pair of positive and negative going pulses at said leading edge and a second pair of negative and positive going pulses at said trailing edge, and wherein said phase control means comprises a voltage-controlled oscillator responsive to the positive and negative going pulses of each of said first and second pairs for generating a variable frequency signal and frequency control means for controlling the frequency of said reference video signal in accordance with said variable frequency signal to generate said phase-controlled reference video signal.

17. Color imaging apparatus wherein an optical image is focused on a photoelectrical conversion target of a color image pickup tube through a color stripe filter having a plurality of successively arranged recurrent groups of different color stripes and converted to an electrostatic image which is scanned in rectangular raster form by an electron beam to generate a luminance signal and a color-multiplexed video signal, wherein said color-multiplexed video signal has a frequency inversely proportional to the intervals at which said recurrent groups are arranged, said color-multiplexed video signal varying in phase with the relative values of primary color components contained in the optical image passing through the stripes of each group and in amplitude with the intensity of said primary color components, comprising:
- first and second delay means connected in series for introducing first and second substantially equal delay times to said luminance signal;
- means for multiplying the amplitude of an output signal from said first delay means;
- adder means for summing the multiplied signal, an output signal from said second delay means and the non-delayed luminance signal and producing first pulses of first and second polarities immediately following the leading edge of the non-delayed luminance signal and second pulses of the second and first polarities immediately following the trailing edge of the non-delayed luminance signal;
- a field memory;
- read-write means for writing into the memory, during a write-in mode, a reference carrier having a duration of at least one field derived from said target when the target is uniformly illuminated by light of a predetermined color passing through said color stripe filter and repeatedly reading the memory during a read-out mode to generate a constant-amplitude reference signal having a reference phase;
- frequency control means for controlling the frequency of said reference signal read out of said memory in response to an output signal from said adder means; and
- means responsive to said color-multiplexed video signal and said frequency-controlled reference signal for deriving color difference signals.

18. Color imaging apparatus wherein an optical image is focused on a photoelectrical conversion target of a color image pickup tube through a color stripe filter having a plurality of successively arranged recurrent groups of different color stripes and converted to an electrostatic image which is scanned in rectangular raster form by an electron beam to generate a luminance signal and a color-multiplexed video signal, comprising:

means including first and second line memories for alternately storing said luminance signal in a first direction and alternately reading the stored luminance signal out of the first and second line memories in a second direction opposite to said first direction;

an integrator for integrating an output signal from said first and second line memories;

means including third and fourth line memories for alternately storing an output signal from said integrator in one direction and alternately reading the stored signal out of the third and fourth line memories in another direction opposite to the first direction;

a differentiator for differentiating said luminance signal;

a differential amplifier having a first input responsive to said luminance signal and a second input responsive to an output signal from said third and fourth line memories;

means for summing output signals from said differentiator and said differential amplifier to generate a phase control signal; and phase control means for phase-controlling said color-multiplexed signal in response to said phase control signal.

19. Color imaging apparatus wherein an optical image is focused on a photoelectrical conversion target of a color image pickup tube through a color stripe filter having a plurality of successively arranged recurrent groups of different color stripes and converted to an electrostatic image which is scanned in rectangular raster form by an electron beam to generate a luminance signal and a color-multiplexed video signal, comprising;

means including first and second line memories for alternately storing said luminance signal in a first direction and alternately reading the stored luminance signal out of the first and second line memories in a second direction opposite to said first direction;

a first differentiator for differentiating an output signal from said first and second line memories;

means for inverting the polarity of an output signal from said differentiator;

means including third and fourth line memories for alternately storing an output signal from said polarity inverting means in one direction and alternately reading the stored signal out of the third and fourth line memories in another direction opposite to the first direction;

a second differentiator for differentiating said luminance signal;

means for summing output signals from said second differentiator and said third and fourth line memories to generate a phase control signal; and phase control means for phase-controlling said color-multiplexed video signal in response to said phase control signal.

* * * * *